Dec. 20, 1966     D. SILVERMAN     3,293,657
DATA PLOTTING SYSTEM
Filed June 22, 1964     3 Sheets-Sheet 1
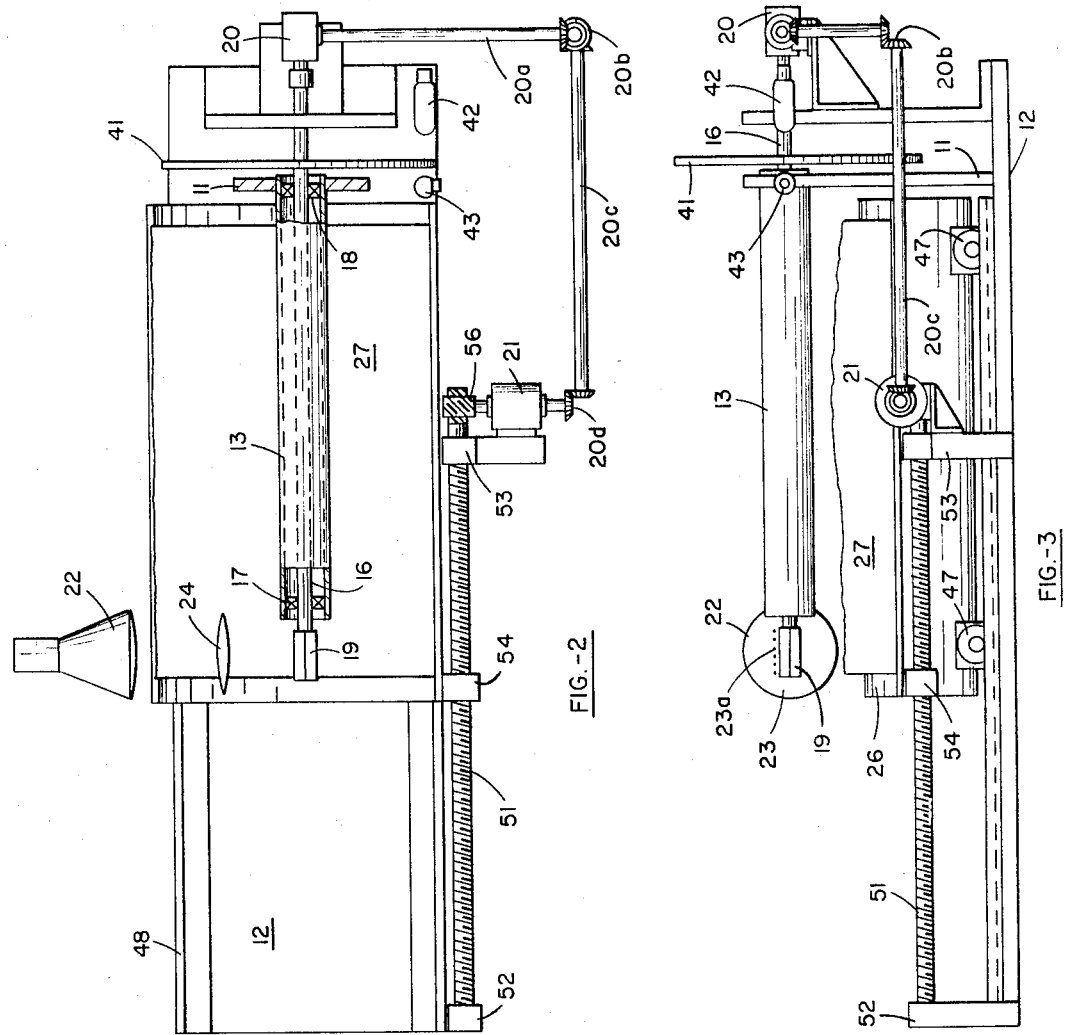
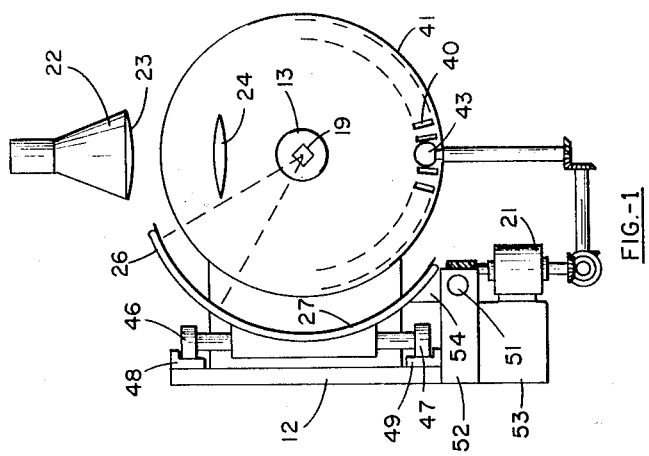
DANIEL SILVERMAN
*INVENTOR.*
BY *William T. William*
ATTORNEY.

Dec. 20, 1966  D. SILVERMAN  3,293,657
DATA PLOTTING SYSTEM
Filed June 22, 1964  3 Sheets-Sheet 2

DANIEL SILVERMAN
*INVENTOR.*

BY
*ATTORNEY.*

DANIEL SILVERMAN
INVENTOR.

United States Patent Office 3,293,657
Patented Dec. 20, 1966

3,293,657
DATA PLOTTING SYSTEM
Daniel Silverman, Tulsa, Okla., assignor to Pan American Petroleum Corporation, Tulsa, Okla., a corporation of Delaware
Filed June 22, 1964, Ser. No. 376,939
15 Claims. (Cl. 346—110)

This invention relates to the plotting of data, and particularly to the plotting of data based on physical measurements such as obtained in seismic prospecting. More specifically, this invention relates to apparatus for the high-speed plotting of seismic or other such data.

Various apparatus is presently available for plotting seismic or other data. However, in such equipment there is a desideratum resulting from limitations on the plotting speed and/or the accuracy of plotting. For example, one apparatus widely used for plotting seismic data requires that photographic paper (on which the plot is to be made) be wrapped on the outside surface of a relatively large and heavy paper holding drum. A seismic camera receiving a signal from a magnetic recorder projects a light beam onto the photographic paper so that one or more seismic traces are produced on the paper. Typically, with such equipment the drum rotates relatively slowly and a number of manual steps are involved, so that the time required for producing a plot of the seismic data is considerable. Because of the nature of such equipment, significant limitations exist as to the speed with which the equipment can be operated. Another type of data handling apparatus presently used involves a cathode ray tube providing a two-dimensional trace and a photographic system for making a record of the trace on the face of the cathode ray tube. In such a plotter there are certain inaccuracies which result from the curvature of the face of the tube, and the inaccuracy is increased with the use of larger portions of the tube face. Other types of plotting equipment, such as that of the electromechanical type which plots data put into it on punched cards or the like is also available and provides relatively good accuracy. However, such electromechanical equipment is relatively slow in operation and this increases the cost of plotting complex data.

An object of the present invention is apparatus for rapidly plotting data to provide a visible record thereof. Another object of the present invention is such plotting apparatus having a high degree of accuracy. Still a further object of the present invention is apparatus for rapidly processing data in digital form to provide a visible record thereof. These and other objects of the present invention will become apparent by reference to the following description of the invention.

In accordance with the present invention there is provided data plotting apparatus comprising a cylindrical shell element adapted to hold a radiation-sensitive film element on the concave side thereof; a source of radiant energy adjacent said shell element for providing radiant energy varying in accordance with a function to be plotted; a rotatable reflector element positioned to receive radiant energy from said source and to traverse the concave side of said film element with a reflected beam of radiant energy; drive means for rotating said reflector element at a substantially constant rate; and input means connected to said source for supplying thereto signals representative of a function to be plotted, said radiant energy source being responsive to variations in said input signals to produce corresponding variations in the radiant energy produced. Preferably, the radiant energy source is a cathode ray tube connected to a reproducible storage means, such as a magnetic recorder, for supplying input data applied to the cathode ray tube, and the magnetic storage unit is driven in synchronous relation to the rotatable reflector so as to supply the input signals to the cathode ray tube at precise times.

A preferred embodiment of apparatus in accordance with the present invention is illustrated in the accompanying drawings, wherein:

FIGURE 1 schematically illustrates an end view of data plotting apparatus employing a cathode ray tube and a rotating mirror to plot data on a photo-sensitive film;

FIGURE 2 is a plan view of the apparatus of FIGURE 1;

FIGURE 3 is an elevational view of the apparatus of FIGURE 1;

Figure 4:
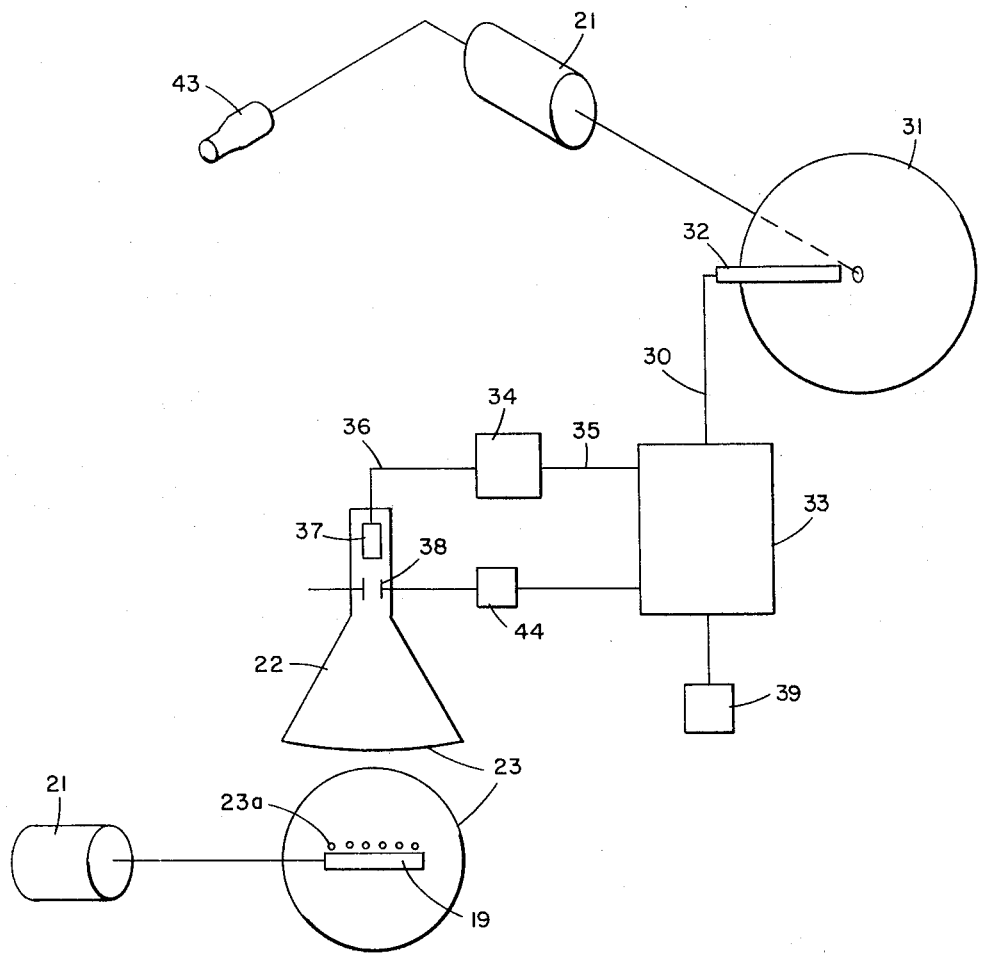
Figure 5:
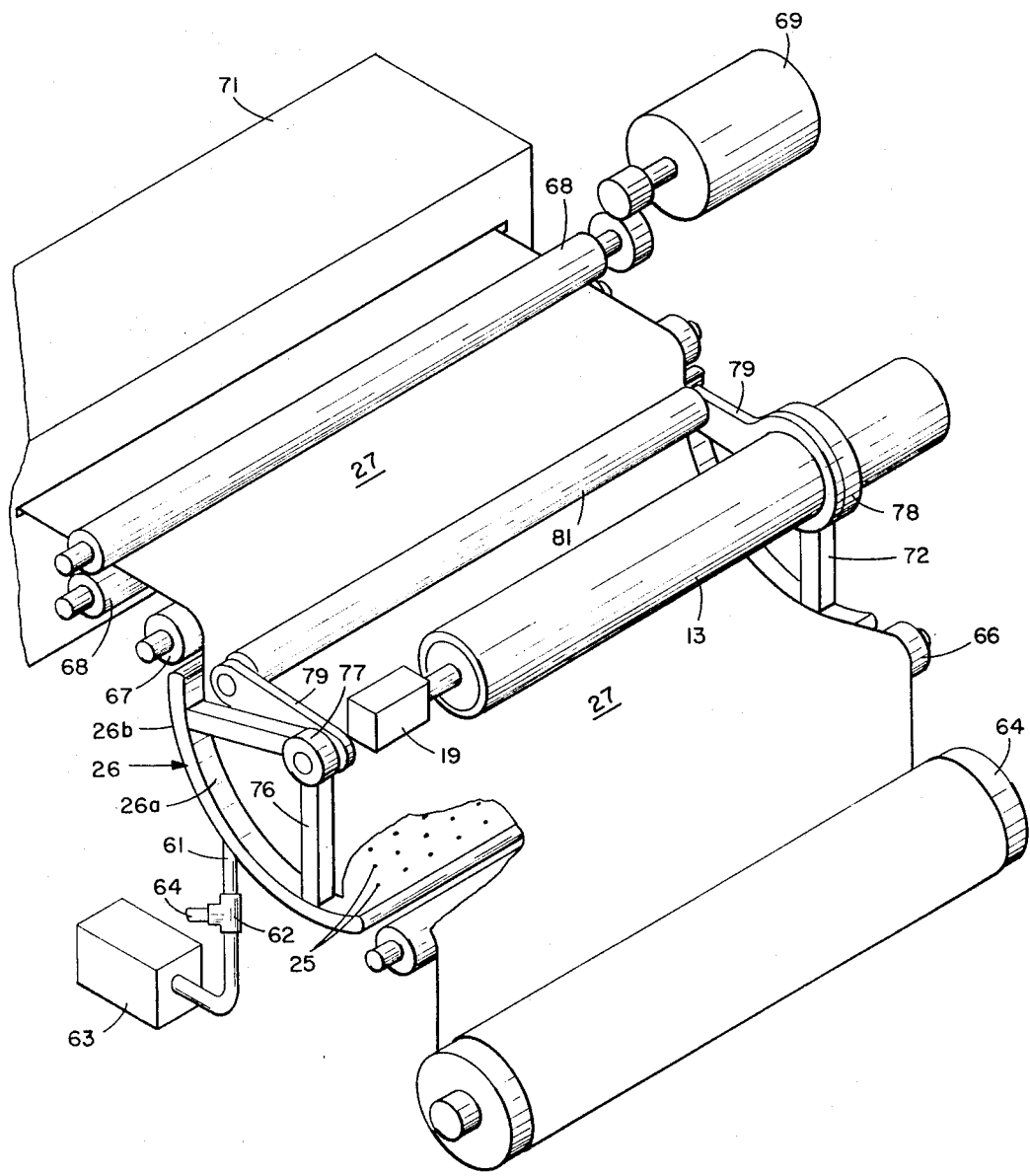

FIGURE 4 diagrammatically illustrates apparatus for supplying input data to a plotter and for synchronizing the data input with operation of the other components of the above apparatus; and FIGURE 5 is illustrative of a preferred film holding device employed with the above apparatus.

Turning now to the drawings, in FIGURES 1, 2 and 3 there is shown a vertical support member 11 secured to a base member 12 for supporting a rigid arm 13 extending horizontally from the vertical support member for a distance at least comparable to the width of the section to be plotted. An outboard support (not shown) may be provided, if desired, to steady the outboard end of arm 13. Positioned in a longitudinal cavity provided in the support arm is a rotatable shaft 16 which may be supported at either end by bearings 17 and 18 so as to turn freely therein. Extending from the outboard end of the rotating shaft is a reflector element such as multifaceted mirror 19. The drive end of the rotating shaft is drivingly coupled to a constant speed drive such as synchronous motor 21 so that the reflector element is rotated by the motor at a preselected constant speed. As shown, shaft 16 is coupled to motor 21 through gear box 20, shaft 20a, gears 20b, shaft 20c and gears 20d so that it is driven continuously at a selected constant speed.

Adjacent reflector 19 at a corresponding level is a radiant energy source such as cathode ray tube 22 which produces luminous energy varying according to variations in applied input signals representative of the function to be plotted. The face 23 of cathode ray tube 22 is directed at reflector 19 and, if desired, lens system 24 may be employed between the tube face 23 and reflector 19. The luminous trace of tube 22 is focused onto the rotating reflector which traverses a cylindrical photo-sensitive film with a beam of reflected light as described below. Preferably, the trace of cathode ray tube 22 is swept in only one dimension, i.e., along a line substantially parallel to the rotational axis of reflector 19.

At one side of the reflector 19 there is positioned a film holder, such as platen 26, adapted to receive a radiation-sensitive film 27 and to maintain the film in a cylindrical form during the plotting operation.

Preferably, film 27 is sheet of flexible photographic film or paper having a suitable photographic emulsion on its inner surface, so that luminous spots 23a which sweep the face 23 of tube 22 sensitize the film. Other suitable radiation-sensitive film may be employed, depending upon the nature of the radiation emitted from source 22. The film forms a partial cylinder, the center of which coincides with the position of mirror 19. Film holder 26 is in the form of a partial cylindrical shell having an arc providing a peripheral surface on its concave side at least as great as the length of the plot to be made. Advantageously, the arc of the cylinder approximates the angular sweep of the reflected beam, which will be determined by the relationship between the cathode ray tube 22 and the faces of reflector 19. The film may be maintained in place on the concave side of the cylindrical shell in the manner hereinafter described. During the time that the reflected beam traverses the inner surface of the cylindrical film the platen is maintained in a fixed position, and upon completion of a sweep of the reflected beam the platen and film are incrementally advanced to the next successive position in the manner hereinafter described.

As mentioned above, the cathode ray tube 22 has a trace which is swept linearly. Typically, this is accomplished by utilizing a single set of deflector plates 38 on the electron gun of the tube 22. The pulsing of the electron gun causes a series of luminous dots to move linearly across the face of the cathode ray tube, the dot locations being determined by the voltages of the input signals applied to the cathode ray tube at a given time. As mentioned above, it is preferred that the sweep of the cathode ray tube trace is in a plane parallel to the rotational axis of the reflector 19 which in turn is located at substantially the central axis of the film held in the platen 26. With such an arrangement the location of the pulses swept across the face 23 of the tube 22 varies with the voltage applied to the deflector plates and the resulting spots of luminous energy 23a strike film 27 to produce thereon a latent image which, upon development, produces a visible image of the trace being plotted.

Advantageously, as shown in FIGURE 4, the function to be plotted is stored on a rotatable magnetic recorder storage means, such as a magnetic drum or disc file 31, which may be of a type commercially available. Pickup head 32 moves over the magnetized surface of the disc file and picks up digital signals recorded thereon serially at a rate controlled by electrical signals received from the synchronizing means driven by the rotating element, as described below. Electrical signals representative of the recorded signals are passed by electrical connector 30 to control box 33 and then by electrical connector 35 to a digital-to-analog converter 34 from which the instantaneous trace voltage is transmitted by electrical connector 36 to the beam brightening grid 37 of cathode ray tube 22. Attenuator 44 may be employed to reduce the sweep voltage to control the sweep voltage applied to deflector plates 38 so as to effect the desired spacing of the luminous spots 23a on the trace of tube 22. Timer 39 connected to control element 33 and to deflector plates 38 controls the readout of data from the disc file to control the sweep of the trace on the face 23 of the cathode ray tube so that the beam is at the correct position as the brightening pulse is received. Timer 39 may be a separate timing device but preferably comprises the timing disc and photoelectric means described hereinafter.

In order to plot a time function it is clear that the radiant energy source which controls one coordinate of the time function, i.e., brightness or lateral displacement, must be in synchronism with the reflector element which controls the other coordinate, i.e., the longitudinal displacement. Advantageously, rotating reflector 19 is driven in synchronism with disc file 31 so that the readout of stored data from the file is presented at the proper time to cathode ray tube 22. Typically, a circular timer element 41 positioned around and attached to rotating shaft 16 is provided around its outer periphery with a series of spaced openings 40. Positioned on one side of circular element 41 is a light source 42 and on the other side is a photo-sensitive element such as photoresistor 43 which receives a beam of light through spaced openings 40 on circular element 41 as it is rotated. Thus, as shaft 16 rotates at a constant speed, light from source 42 will be received intermittently by photo-resistor 43 to permit timed characteristic electrical signals to be transmitted to disc file 31 to synchronize its rotation with the rotation of reflector element 19 or to read out stored data in timed sequence so as to supply input signals to cathode ray tube 22 at times determined by the rotation of reflector 19. Of course, other known methods of synchronizing digital systems can be used to accomplish this.

When a sweep of the reflected beam from reflector 19 has been completed around film 27, platen 26 is incrementally advanced to the next position in order that an additional trace may be plotted thereon. Platen 26 preferably is mounted on rollers 46 and 47 which run on rails 48 and 49 extending along the length of the partial cylinder. Lead screw 51 rotatably supported in end bearings 52 and 53 is rotated in threaded nut 54 affixed to platen 26 so that rotation of the lead screw moves platen 26 by a distance determined by the pitch of the threads and the angle of rotation. Means are provided for driving the lead screw. This can be a separate electric motor, or preferably it is driven through a gear 56 on a takeoff from motor 21 so that upon completing a sweep of the reflected beam on the film, lead screw 51 is rotated to advance platen 26 by the desired amount. This advance can be stepwise, by incremental movement after each or a group of sweeps, or it can be on a continuous feed basis where all traces are slightly skewed.

As mentioned hereinbefore, film 27 may be held on platen 26 by a vacuum. As shown in FIGURE 5, platen 26 is formed of an inner wall 26a provided with perforations 25 spaced over its surface and outer wall 26b spaced a suitable distance from wall 26a. The space between inner perforated wall 26a and outer wall 26b is evacuated through pipe 61 and three-way valve 62 connected to vacuum pump 63. Film 27 advantageously is supplied from a film roll 64 rotatably supported on roller 66 extending along the lower edge of cylindrical shell 26. The film extends across the concave side of the film holder and over another parallel roller 67 at the upper edge of film holder 26 and through drive rolls 68 driven by motor 69. As the film is moved across the film holder, it is fed by drive rolls 68 into a light-tight magazine 71 for storage until such time as it is desired to develop the film. It is to be understood that the preferred apparatus described herein is encased in a suitable darkened cabinet to exclude extraneous light or other such radiation which adversely affects the film on which the plot is being made.

At each end of platen 26 are frame supports 72 and 76 which support bearings 77 and 78 aligned on the longitudinal axis of the film holder 26. One of the bearings, such as 78, preferably is provided with an opening having a large enough diameter to permit arm 13 to pass through it so that reflector 19 can be positioned along the longitudinal axis of the film holder. Mounted on these bearings is a frame member 79 which holds horizontal roller 81 made of a soft rubber or other suitable material. The length of the arms of frame 79 is such as to, for example, press roller 81 against the surface of film 27 when the roller is swung along the concave surface of platen 26. Thus, moving roller 81 over film 27 extending between rollers 67 and 66 presses the film into intimate contact with perforated wall 26a where it is held by the vacuum. The size of openings 25 should be small so that when the holes are only partially covered there will still be strong enough vacuum to hold the film.

To load the platen, the film 27 is threaded over guide rollers 66 and 67 and through drive rolls 68. The vacuum is turned on by turning valve 62 to seal off exhaust line 64. Roller 81 is passed over the surface of film 27 to press it against perforated surface 26a. After roller 81 has completed its sweep, it is moved back to its original position out of the optical path and the data is then plotted as described above. At the end of the plotting the vacuum on the backside of the perforated wall 26a is released by turning valve 62 to open exhaust line 64. Motor 69 drives rolls 68 to feed the film into magazine 71 and a new length of film is then brought into the holder and placed into position as described above.

Various of the components employed in the above-described apparatus, such as the radiant energy source, the magnetic storage, the digital-to-analog converter, etc., have not been described in detail, since such items are well known in the art and are commercially available. From the foregoing description, it is believed the skilled artisan can readily select such items for use in the apparatus of the invention.

While my invention has been described with reference to the preferred embodiment described above, it will be understood that various alterations and modifications in the details of construction and operation which fall within the spirit and scope of the appended claims will become apparent to the skilled artisan. For example, instead of the cathode ray tube radiation source, it is possible to use the conventional type of d'Arsonnal galvanometer source supplied with analog signals from a magnetic storage means. Or a multiplicity of glow lamp units might be used, as is well known in the art. Also, any suitable radiant energy, including ultraviolet and luminous energy, with a corresponding record sheet sensitive to this radiation may be used. Single trace or multiple trace recordings may be made with each sweep of the reflecting surface.

I claim:
1. Data plotting apparatus comprising:
 (a) signal source means providing signals to be recorded, and including means to provide brief increments of said signal in timed sequence upon command;
 (b) radiation means for forming at least one beam of radiation in accordance with the variations in the signal from said signal means;
 (c) control means between said signal means and said radiation means for commanding said signal means;
 (d) radiation sensitive sheet means;
 (e) rotating means to relatively sweep said beam of radiation across said sheet means;
 (f) synchronizing means responsive to incremental rotation of said rotating means for commanding said control means to cause the passage of one of said brief increments of said signals to said radiation means upon each incremental rotation of said rotating means.

2. Data plotting apparatus comprising:
 a record sheet holding element adapted to position therein a concave cylindrical radiation-sensitive record sheet;
 a source of radiant energy for producing radiant energy varying in accordance with a function to be plotted;
 a rotatable reflector element positioned to receive radiant energy from said source and to traverse the concave side of said record sheet with a beam of reflected radiant energy;
 drive means for rotating said reflector element at a substantially constant speed;
 a signal source;
 input means connecting said signal source to said radiant energy source for supplying thereto signals representative of a function to be plotted, said radiant energy source being responsive to variations in said input signals to produce corresponding variations in the radiant energy produced thereby; and
 synchronizing means synchronously connecting said reflector element and said signal source to cause said signal to be supplied to said radiant energy source at times determined by the rotation of said reflector element.

3. The apparatus of claim 2 wherein said radiant energy source is a cathode ray tube.

4. The apparatus of claim 2 wherein the rotational axis of said reflector element substantially coincides with the longitudinal axis of said cylindrical record sheet.

5. The apparatus of claim 3 wherein the rotational axis of said reflector element is substantially parallel to the sweep of the trace of said cathode ray tube.

6. The apparatus of claim 2 wherein said input means further comprises a rotatable magnetic storage means for storing the function to be plotted.

7. The apparatus of claim 2 wherein said radiant energy source produces luminous energy and wherein said radiation-sensitive record sheet is a photographic film.

8. The apparatus of claim 2 further including means for incrementally advancing said record sheet element along a line transverse to the sweep of said reflected radiant energy beam.

9. The apparatus of claim 2 in which the stored signals of the signal source comprise digital signals which are read out of storage serially in response to signals generated by the rotation of said reflector element.

10. Data plotting apparatus comprising:
 a record sheet holder forming a partial cylinder and adapted to maintain therein on its concave side a radiation-sensitive sheet;
 a cathode ray tube for producing a linearally swept trace of luminous energy;
 a rotatable reflector element positioned to receive luminous energy from said cathode ray tube and to traverse the concave side of said record sheet with a beam of reflected luminous energy;
 the rotational axis of said reflector element substantially coinciding with the longitudinal axis of said record sheet;
 drive means connected to said reflector element for rotating said reflector element at a substantially constant speed;
 magnetic recorder means connected to said cathode ray tube for supplying thereto input signals representative of a function to be plotted and to cause a trace of luminous energy to sweep the face of said cathode ray tube along a line substantially parallel to the longitudinal axis of said record sheet; and
 synchronizing means synchronously connecting said reflector element and said magnetic recorder means to cause said input signals to be supplied to said cathode ray tube at times determined by the rotation of said reflector element.

11. The apparatus of claim 10 further including means for incrementally advancing said record sheet holder along a line transverse to the sweep of said reflected luminous energy beam.

12. The apparatus of claim 10 in which said synchronizing means includes means for creating characteristic signals at incremental angular positions of said reflector element.

13. The apparatus of claim 10 in which said synchronizing means comprises photoelectric means including a rotating mask provided with spaced light-controlling elements.

14. The apparatus of claim 10 in which the stored signals comprise digital signals which are read out of storage serially in response to signals generated by the rotation of said reflector element.

15. The apparatus of claim 10 in which said synchronizing means includes a rotating disc synchronized with said rotating reflector element a plurality of light-controlling elements equally spaced around the periphery of said disc, a light source and a light sensitive detector in operating relation with said light-controlling elements.

References Cited by the Examiner

UNITED STATES PATENTS

| | | | |
|---|---|---|---|
| 2,511,892 | 6/1950 | Wise | 178—6.6 X |
| 2,898,176 | 8/1959 | McNaney | 346—110 |
| 3,154,371 | 10/1964 | Johnson | 346—108 |
| 3,158,433 | 11/1964 | Alexander et al. | 346—110 |

RICHARD B. WILKINSON, *Primary Examiner.*

J. WHARTARY, *Assistant Examiner.*